May 19, 1970      G. E. HAGEN      3,512,492

FLOATING STRUCTURE AND METHOD OF MAKING

Filed Jan. 31, 1968      2 Sheets-Sheet 1

INVENTOR
GLENN E. HAGEN

BY *Lake & Pugh*

ATTORNEYS

United States Patent Office 3,512,492
Patented May 19, 1970

3,512,492
FLOATING STRUCTURE AND METHOD OF MAKING
Glenn Edward Hagen, Baratarie Seaway, Lafitte, La. 70067
Filed Jan. 31, 1968, Ser. No. 701,960
Int. Cl. B63b *35/00;* B63c *1/02*
U.S. Cl. 114—0.5                             1 Claim

ABSTRACT OF THE DISCLOSURE

An open-bottomed floating structure, e.g. a platform, of molded material, particularly concrete, having tapered skirts. Air escapes holes are included near the bottom of the outer skirts and air injection means of minute dimensions are located in the inner skirts or baffles, both for stabilization purposes. The method of manufacture includes immersing the mold and molded structure in water, bushing the mold and pumping air between the structure and mold, thereby releasing the structure to float to the surface. The mold is then resurfaced to be reused.

---

This invention relates to the field of floating structures, such as barges, boats and floating docks and platforms. In particular, it relates to improved structures which are open-bottomed, and which derive their buoyancy from air trapped in open-bottomed compartments, and an improved method of production.

The concept of open-bottomed floating devices using trapped air for buoyancy has been taught by others, and it became well known in the art that they are seaworthy and have relatively light weight in relation to their deck area; e.g. note U.S. Pat. 3,276,209 to D. R. Mosdell.

However, these floating devices have been to a degree unstable, particularly during load shifts, and relatively difficult to produce by inexpensive, simple, mass production methods. To rectify these problems the invention contemplates the providing of tapered skirts or side walls on the platform and the inclusion of two different air transfer means. The first is a series of air escape holes provided near the bottom of each outer skirt to permit air to escape from the higher chamber (s) should the structure begin to list to thereby decrease the buoyancy of that chamber and counteract the list. The second is a set of common injection or replenishing means of minute dimensions provided in the inner skirts or baffles to insure that air is injected into chambers that need it for floatation, stabilization, or leveling purposes. The invention further contemplates the method of manufacturing the floating structure by the following steps: (a) molding the structure; (b) immersing the mold and structure in water; (c) pumping air between the mold and the structure to thereby release the structure and float it to the surface; (d) retrieving the mold and repeating the steps for another structure.

It is, thus, a basic purpose of the invention to provide an improved design of floating platform which is highly stable, which maintains its inner water surface at a predetermined level, and which regulates this level in such a manner as to partly compensate for uneven loading and maintains the platform at a relatively level attitude.

It is a further principle purpose of this invention to provide a design of open-bottom floating platform which can be cast in one piece in a reusable mold, and to provide a design for said mold, and a method and means by which the floating platform can be released from said mold.

Figure 1:
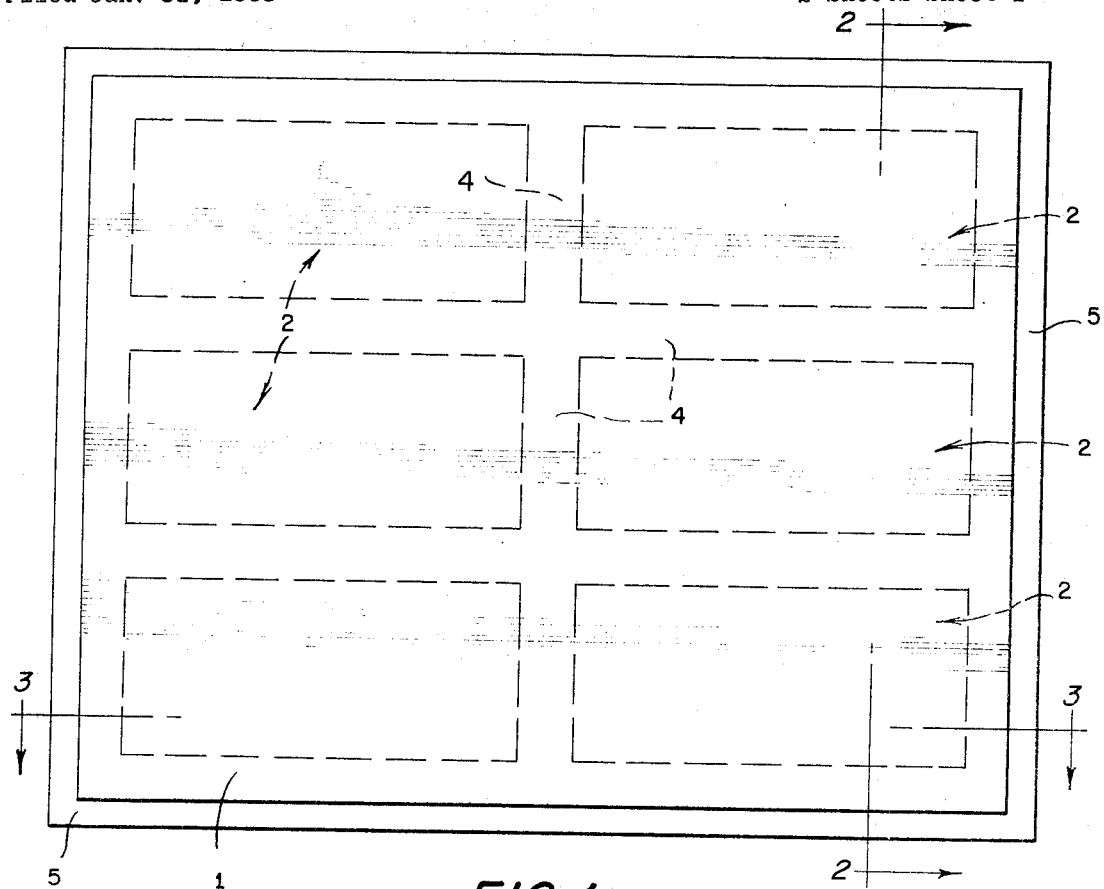
Figure 2:
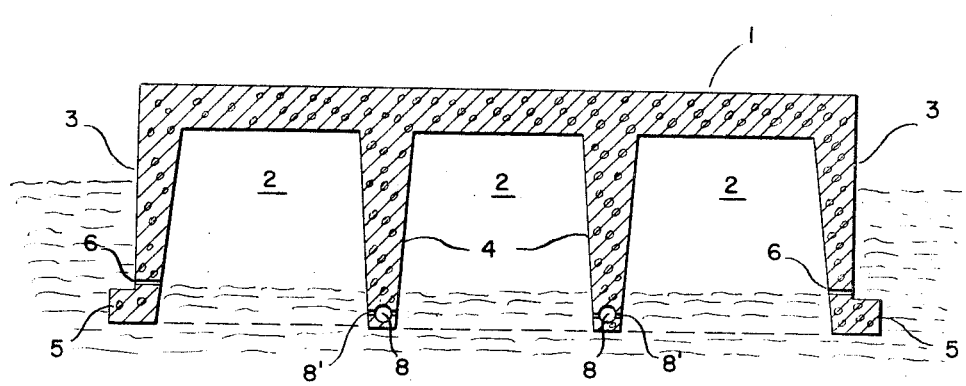
Figure 3:
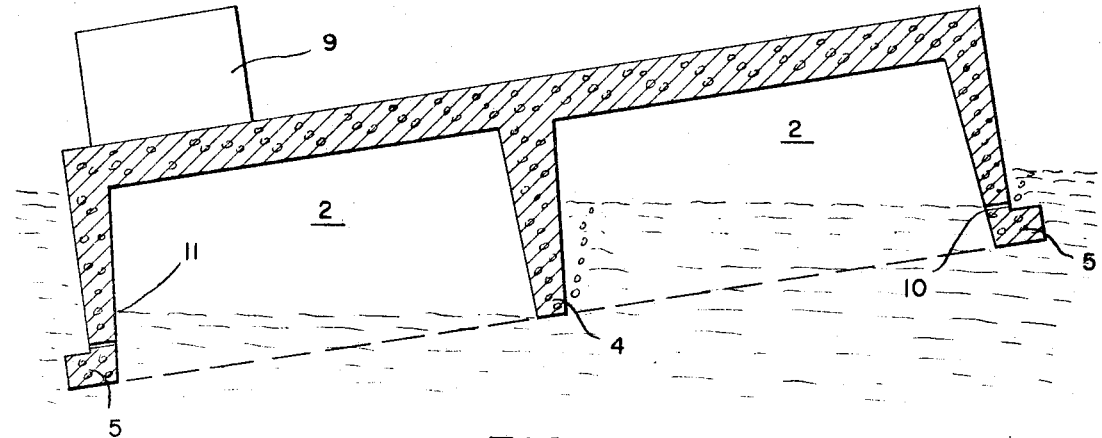
Figure 4:
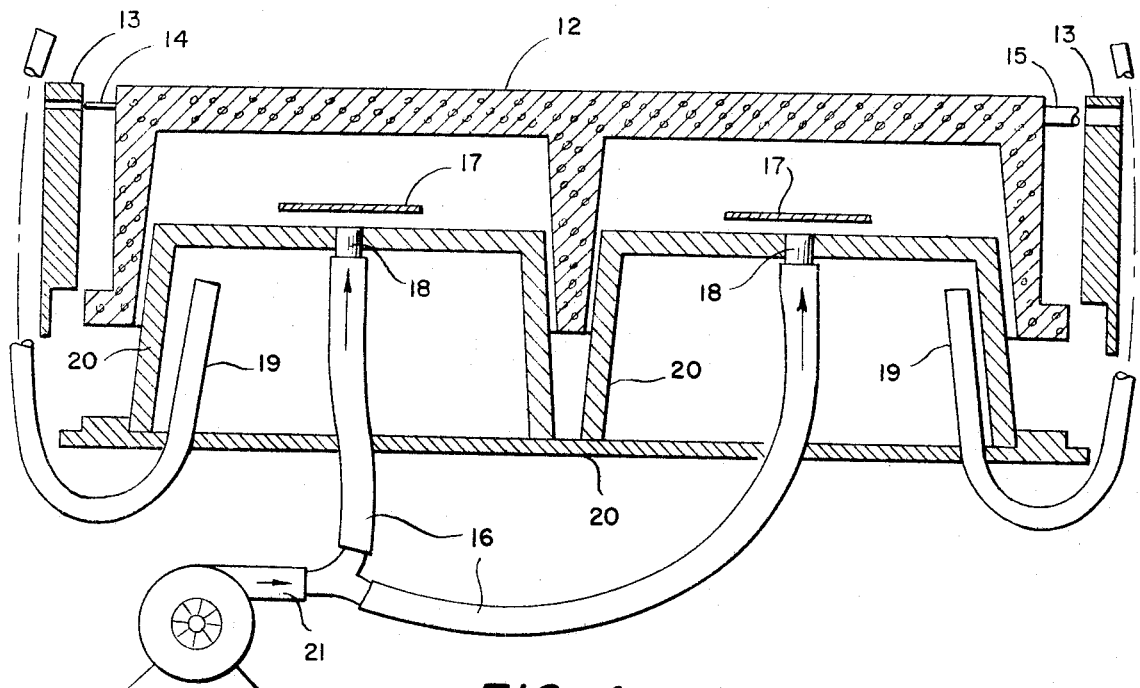

Other objects and advantages of the invention and a full understanding thereof may be had by referring to the following description and claims taken together with the accompanying drawings, in which:

FIG. 1 is a top plan view of the inventive structure;
FIGS. 2 and 3 are cross-sectional side views taken along section lines 2 and 3, respectively, of FIG. 1; and
FIG. 4 is a cross-sectional view, similar in perspective to FIG. 3, illustrating the inventive method of molding the structure of FIGS. 1–3.

Referring to FIGS. 1 and 2 a typical embodiment of the invention comprises a reinforced concrete deck 1 supported by the pressure of air trapped in six cavities 2. Suspended from the deck around its periphery and integral therewith, is a skirt 3 whose purpose is to hold the air entrapped. Also suspended from the deck, at intermediate points, and integral therewith, are one or more baffles 4 whose purpose is to stabilize the platform by preventing the air from shifting when an uneven load is applied. Both sides of the baffles and the inner side of the skirt art tapered for the purpose of facilitating the release of the platform from the form in which it is cast and to increase the volume per foot of depth in the chambers 2. At the base of the skirts is an optional reinforced footing 5 whose purpose is to stiffen the platform and increase its bending strength. A short distance up from the bottom of the skirt in an orifice 6 whose principle purpose is to release excess air so that ballast water 7 is retained. The purpose of retaining ballast water is to increase the stability of the platform on extreme rolls, and to prevent the release of air from under the skirt on slight rolls. Air released from under the skirt in bulk causes objectionable noise and vibration. An air line 8 is imbedded in the bottom of one set of the baffles 4 with an opening 8 into each cavity for the purpose of replenishing air.

The opening 8 is of minute dimensions, for example, a round fine hole having a diameter of five-one-thousanths of an inch (.005) to insure that the replenishing air goes to all chambers. When replenishing of the air in chambers 2 is desired, air is supplied to the air line 8 under a high pressure of, for example, a half pound per square inch (0.5 p.s.i.). Were it not for the minuteness of the opening 8 the replenishing air would have a tendency to go only to the chamber having the greatest amount of air.

A further purpose of the release or escape 6 is illustrated in FIG. 3. When an off-center load 9 is applied, the platform tends to list; however, the release orifice on the high side 10 releases more air than does the orifice on the low side 11 because the latter is on the lower side of its respective cavity. The resulting change in relative buoyancy partly compensates for the off center load. Within limits, the release orifice 6 will reduce the angle of list to approximately one half of what it would be without such an orifice.

For exemplary purposes, the floating platform illustrated in FIGS. 1–3 has six chambers but any number of multiple chambers could be used. The typical dimensions of the chambers illustrated are two to six feet in width and three to twenty feet in length. A typical floating platform of concrete having twelve chambers if forty-four-hundred pounds (4,400 lbs.).

FIG. 4 shows in cross-section a platform 12 being released from a re-usable form 20 made for example, of steel. The outer plates 13 are moved directly away from the cast platform, thus allowing direct protrusion of embedded studs 14 for coupling purposes or utility pipes 15 or the like. The bottom of the form is in one piece and is shaped much like a waffle iron. The cavity molds are tapered to facilitate release from the concrete or other cast material. To accomplish the release, compressed air from a suitable pump 21 supplied through lines 16 is applied between the forms and the casting. Removable plates 17 prevent the concrete or other material from plugging the air entrance holes 18 when it is poured. A difficulty sometimes encountered in molding techniques is that the first cavity form to break loose releases the air pressure and stops the release of the others. This is overcome by immersing the platform, together with the mold, in water until the top of the cast platform is awash to thereby build up the pressure head. Syphon tubes 19 allow air to escape from the mold to make this immersion possible. When thus submerged, even if one cavity form breaks loose ahead of the rest, air in that cavity cannot escape until it builds enough pressure to fill the cavity to overflowing, and this much pressure will release all other cavity forms. After the form has broken loose, air continues to flow into the cavities until they are full and the dock floats away from the sunken mold. The mold is then raised, for example, by pumping air into the mold through pipes 19, re-assembled and used again. Should a fully unitary mold be desired, the footing 5 may be omitted and the outer side of the skirts 3 properly tapered.

Many variations in the above described structural details and method steps and the same may be varied without departing from the spirit and scope of the invention.

What is claimed as invention is:

1. The method of casting in a mold, having removable side plates and integral bottom, a hollow casting having a plurality of open-bottomed chambers formed around a plurality of upwardly tapering projections in said mold defining holes in the top and bottom of each projection, said top holes being respectively covered by removable top plates and said bottom and top holes being connected respectively to air pressure hoses, and separating said casting from said mold comprising the steps: covering the top holes in the mold with top plates; pouring casting material in the mold and letting said material set; immersing casting and form in water; removing side plates from mold; pumping air through said top holes to displace top plates and enter between the mold and casting to separate them; confining said high pressure air to the casting chambers for floating said casting out of said tapered mold; pumping high pressure air through said bottom holes in said mold to float it to the surface of the immersing water after said casting is floated out of the mold; and replacing said side and top plates on said mold for reuse in making another casting.

References Cited

UNITED STATES PATENTS 3,426,109   2/1969   Dempster _____ 114—0.5

TRYGVE M. BLIX, Primary Examiner

U.S. Cl. X.R.

264—34